United States Patent
Kitazumi

(10) Patent No.: US 12,361,532 B2
(45) Date of Patent: Jul. 15, 2025

(54) OPERATION DETERMINATION APPARATUS AND OPERATION DETERMINATION METHOD

(71) Applicant: OMRON Corporation, Kyoto (JP)

(72) Inventor: Kazunori Kitazumi, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 373 days.

(21) Appl. No.: 17/928,583

(22) PCT Filed: May 24, 2021

(86) PCT No.: PCT/JP2021/019506
§ 371 (c)(1),
(2) Date: Nov. 29, 2022

(87) PCT Pub. No.: WO2022/004189
PCT Pub. Date: Jan. 6, 2022

(65) Prior Publication Data
US 2023/0237637 A1    Jul. 27, 2023

(30) Foreign Application Priority Data
Jun. 29, 2020 (JP) .................. 2020-111328

(51) Int. Cl.
*G06T 7/00* (2017.01)
*G06V 20/52* (2022.01)

(52) U.S. Cl.
CPC ............ *G06T 7/0004* (2013.01); *G06V 20/52* (2022.01); *G06T 2207/30164* (2013.01)

(58) Field of Classification Search
CPC ......... G06T 7/0004; G06T 2207/30164; G06T 2207/10016; G06T 2207/20084;
(Continued)

(56) References Cited

U.S. PATENT DOCUMENTS 11,170,244 B2 *  11/2021  Ozawa .................. G06V 20/40

FOREIGN PATENT DOCUMENTS

| JP | 2008003781 A | 1/2008 |
|----|---|---|
| JP | 2010211623 A | 9/2010 |

(Continued)

OTHER PUBLICATIONS

International Search Report issued in Intl. Appln. No. PCT/JP2021/019506 mailed Aug. 3, 2021. English translation provided.
(Continued)

*Primary Examiner* — Stephen R Koziol
*Assistant Examiner* — Michael Kim Maiden
(74) *Attorney, Agent, or Firm* — ROSSI, KIMMS & McDOWELL LLP

(57) ABSTRACT

An operation determination apparatus includes an image obtainer that obtains a captured image of a worker gripping a component and performing an operation of attaching the component to a workpiece, a component detector that detects a component in the captured image obtained by the image obtainer, a grip determiner that determines, based on a detection result from the component detector, whether the worker is gripping a component and whether the component gripped by the worker is a component to be attached to the workpiece in the operation, and a notification controller that controls a predetermined notification to be provided in response to the grip determiner determining that the component gripped by the worker is not the component to be attached to the workpiece in the operation.

11 Claims, 7 Drawing Sheets

(58) Field of Classification Search
CPC ........... G06T 7/246; G06T 7/73; G06V 20/52; Y02P 90/30
See application file for complete search history.

(56) References Cited

FOREIGN PATENT DOCUMENTS

| | | | |
|---|---|---|---|
| JP | 2011200331 A | * | 10/2011 |
| JP | 2017147689 A | * | 8/2017 |

OTHER PUBLICATIONS

Written Opinion issued in Intl. Appln. No. PCT/JP2021/019506 mailed Aug. 3, 2021. English translation provided.

* cited by examiner

| Process | 1 | | | 2 | | | 3 | | |
|---|---|---|---|---|---|---|---|---|---|
| Operation | 1-1 | 1-2 | 1-3 | 2-1 | 2-2 | 2-3 | 3-1 | 3-2 | 3-3 |
| Component | 302a | 302b | 302c | 302d | 302e | 302f | 302g | 302h | 302i |

FIG. 9A  Workpiece
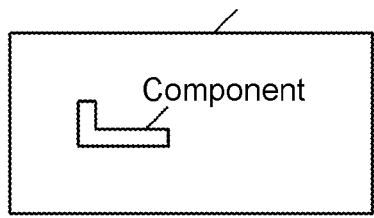
FIG. 9B
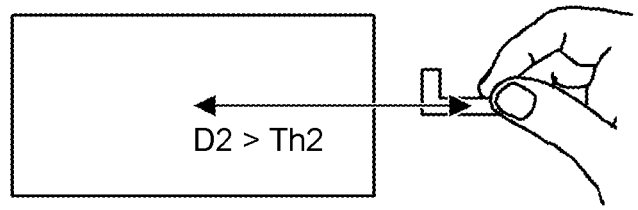
FIG. 9C
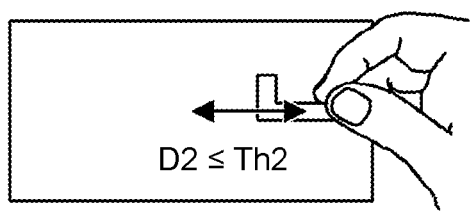
FIG. 9D
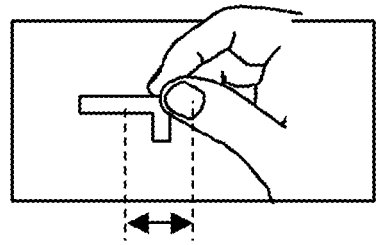
FIG. 9E
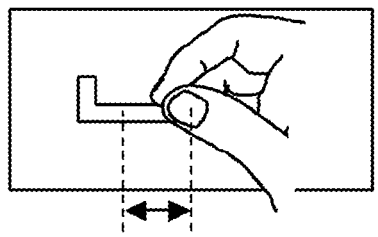

OPERATION DETERMINATION APPARATUS AND OPERATION DETERMINATION METHOD

TECHNICAL FIELD

The present invention relates to a technique for determining whether operations are performed appropriately.

BACKGROUND ART

Mistakes or omissions in operations for manufacturing products affect the quality of the products. Patent Literature 1 describes a technique for determining whether the physical movement of a worker (e.g., movement of hands or feet) matches predetermined movement based on a captured image (video) and uses the determination result to determine an operation corresponding to the worker's movement.

CITATION LIST

Patent Literature

Patent Literature 1: Japanese Unexamined Patent Application Publication No. 2008-003781

SUMMARY OF INVENTION

Technical Problem

Different workers have different physical features. A worker does not always move in a predetermined manner in a particular operation. Thus, the technique described in Patent Literature 1 may not accurately determine whether operations are performed appropriately, and mistakes or omissions may occur in the operations.

In response to the above issue, one or more aspects of the present invention are directed to a technique for accurately determining whether operations are performed appropriately to reduce mistakes or omissions in the operations.

Solution to Problem

The technique according to one or more aspects of the present invention has the structure described below.

An operation determination apparatus according to a first aspect of the present invention includes an image obtainer that obtains a captured image of a worker gripping a component and performing an operation of attaching the component to a workpiece, a component detector that detects a component in the captured image obtained by the image obtainer, a grip determiner that determines, based on a detection result from the component detector, whether the worker is gripping a component and whether the component gripped by the worker is a component to be attached to the workpiece in the operation, and a notification controller that controls a predetermined notification to be provided in response to the grip determiner determining that the component gripped by the worker is not the component to be attached to the workpiece in the operation. The predetermined notification is, for example, a warning (an alert) indicating that the operation is performed inappropriately. The predetermined notification is provided by, for example, displaying graphics (icons or messages), producing a sound, or turning on a lamp. The predetermined notification is provided to the worker or a manager (supervisor) who manages operations.

A component (the type of the component, such as the shape or size) to be attached to a workpiece in an operation has predetermined features independently of a worker. With the structure described above, accurate determination as to whether the operation is appropriately performed is achieved by determining whether the component gripped by the worker is the component to be attached to the workpiece in the operation. When the component gripped by the worker is determined not to be the component to be attached to the workpiece in the operation, the predetermined notification is provided. This can reduce mistakes or omissions in the operation.

A worker gripping a component tends to move the component greatly to attach it to a workpiece. Thus, the grip determiner may determine that the worker is gripping the component in response to a distance traveled by the component detected by the component detector being greater than or equal to a first threshold.

Although a component that is not gripped by a worker may move due to, for example, movement of a platform, a gripped component typically moves greater than the component that is not gripped. The grip determiner may thus select, in response to the component detector detecting a plurality of components, a component traveling a greatest distance from the plurality of components, and may determine, in response to a distance traveled by the selected component being greater than or equal to the first threshold, that the worker is gripping the component. This allows the component gripped by the worker to be detected (identified) highly accurately from the plurality of detected components.

The operation determination apparatus may further include an information obtainer that obtains information indicating a correspondence between the operation and a component to be attached to the workpiece in the operation. The grip determiner may determine whether the component gripped by the worker is the component to be attached to the workpiece in the operation based on the detection result from the component detector and the information obtained by the information obtainer.

The operation determination apparatus may further include an operation completion determiner that determines whether a predetermined condition to indicate completion of the operation is satisfied based on the detection result from the component detector in response to the grip determiner determining that the component gripped by the worker is the component to be attached to the workpiece in the operation. This allows determination as to whether the operation is appropriately complete as well as whether the operation is performed appropriately.

Typically, when a component is attached to a workpiece, the distance between them is shorter. Thus, the predetermined condition may include a distance between the component gripped by the worker and the workpiece being less than or equal to a second threshold. Typically, in attaching a component to a workpiece, the position or the orientation of the component relative to the workpiece is often predetermined. Thus, the predetermined condition may include the component being at a predetermined position relative to the workpiece or the component being in a predetermined orientation relative to the workpiece.

The image obtainer may obtain a captured image of at least one operation including the worker placing the workpiece in a predetermined area after completing the at least one operation. The component detector may detect the workpiece in the captured image obtained by the image obtainer. The operation completion determiner may determine whether the workpiece is placed in the predetermined area based on the detection result from the component detector. The notification controller may provide the predetermined notification in response to the operation completion determiner determining that the workpiece is placed in the predetermined area before completion of the at least one operation. The structure reduces omissions in the operation more reliably.

The operation determination apparatus may further include a hand detector that detects a hand of the worker in the captured image obtained by the image obtainer. The operation completion determiner may use a position of the hand detected by the hand detector as a position of the component gripped by the worker in response to the grip determiner determining that the component gripped by the worker is the component to be attached to the workpiece in the operation and then the component gripped by the worker being undetected by the component detector. Thus, although the component gripped by the worker may be covered by the worker's hand and undetectable, the determination as to whether the operation is complete can be performed.

An operation determination method according to a second aspect of the present invention includes obtaining a captured image of a worker gripping a component and performing an operation of attaching the component to a workpiece, detecting a component in the obtained captured image, determining, based on a result of the detecting, whether the worker is gripping a component and whether the component gripped by the worker is a component to be attached to the workpiece in the operation, and controlling a predetermined notification to be provided in response to the component gripped by the worker being determined not to be the component to be attached to the workpiece in the operation.

One or more aspects of the present invention may be directed to an operation determination system including at least one of the components or functions described above. One or more aspects of the present invention may also be directed to an operation determination method or a control method for an operation determination system including at least part of the above processes, a program for causing a computer to implement the method, or a non-transitory computer-readable storage medium storing the program. The above structure and processes may be combined with one another unless any technical contradiction arises.

Advantageous Effects of Invention

The technique according to the above aspects of the present invention can accurately determine whether operations are performed appropriately and reduce mistakes or omissions in the operations.

BRIEF DESCRIPTION OF DRAWINGS

FIGS. 9A to 9E are diagrams of a component and a workpiece in example states.

DESCRIPTION OF EMBODIMENTS

Example Use

An example use of the present invention will now be described. Different workers have different physical features. A worker does not always move in a predetermined manner in a particular operation. A known technique for determining whether a physical movement (e.g., movement of hands or feet) of a worker matches predetermined movement may not accurately determine whether an operation is performed appropriately, and mistakes or omissions may occur in the operation.

Figure 1:
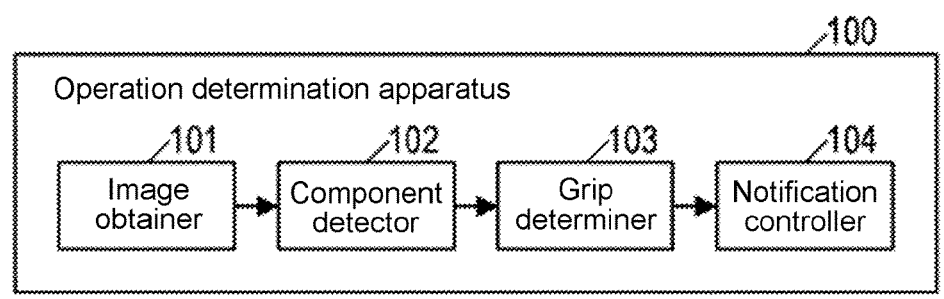
FIG. 1 is a block diagram of an operation determination apparatus according to an embodiment of the present invention showing an example structure.

FIG. 1 is a block diagram of an operation determination apparatus 100 according to an embodiment of the present invention showing an example structure. The operation determination apparatus 100 includes an image obtainer 101, a component detector 102, a grip determiner 103, and a notification controller 104. The image obtainer 101 obtains a captured image of a worker gripping a component and performing an operation of attaching the component to a workpiece. The component detector 102 detects components in the image obtained by the image obtainer 101. The grip determiner 103 determines, based on the detection result from the component detector 102, whether the worker is gripping a component and whether the component gripped by the worker is a component to be attached to the workpiece in the operation. When the grip determiner 103 determines that the component gripped by the worker is not the component to be attached to the workpiece in the operation, the notification controller 104 controls a predetermined notification to be provided. The image obtainer 101 is an example of an image obtainer in an aspect of the present invention. The component detector 102 is an example of the component detector in an aspect of the present invention. The grip determiner 103 is an example of the grip determiner in an aspect of the present invention. The notification controller 104 is an example of the notification controller in an aspect of the present invention. The predetermined notification is, for example, a warning (an alert) indicating that the operation is performed inappropriately. The predetermined notification is provided by, for example, displaying graphics (icons or messages), outputting a sound, or turning on a lamp. The predetermined notification is provided to the worker or a manager (supervisor) who manages operations.

A component (the type of the component, such as the shape or size) to be attached to a workpiece in an operation has predetermined features independently of a worker. With the structure described above, accurate determination as to whether the operation is appropriately performed is achieved by determining whether the component gripped by the worker is the component to be attached to the workpiece in the operation. When the component gripped by the worker is determined not to be the component to be attached to the workpiece in the operation, the predetermined notification is provided. This can reduce mistakes or omissions in the operation.

First Embodiment

A first embodiment of the present invention will now be described.

Figure 2A:
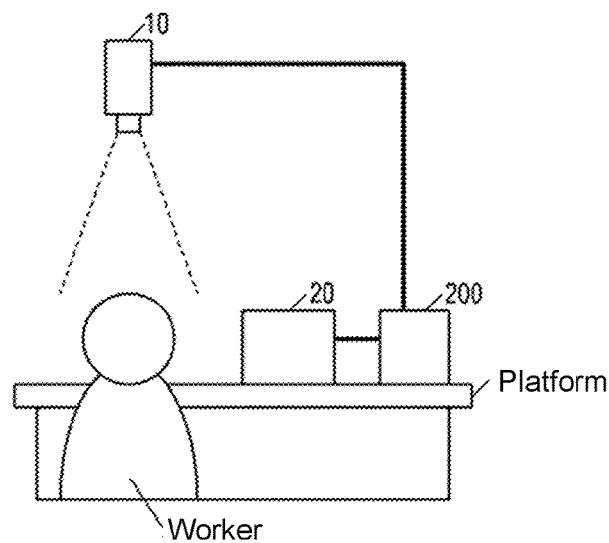
FIG. 2A is a schematic diagram of an operation determination system in a first embodiment, showing an overall example structure.

FIG. 2A is a schematic diagram of an operation determination system in the first embodiment, showing an overall example structure. The operation determination system in the first embodiment includes a camera 10, a personal computer (PC) 200 (operation determination apparatus), and a notifier 20. The camera 10 and the PC 200 are connected to each other with a wire or wirelessly. Similarly, the notifier 20 and the PC 200 are connected to each other with a wire or wirelessly.

The camera 10 captures an image using an image sensor installed in the camera 10 and outputs the captured image to the PC 200. In the first embodiment, the camera 10 outputs an operation image of a worker gripping a component and performing an operation of attaching the component to a workpiece to the PC 200. The PC 200 determines whether the operation is performed appropriately based on the operation image. When determining that the operation is performed inappropriately, the PC 200 outputs a control signal to the notifier 20 to provide a predetermined notification. The notifier 20 includes at least one of, for example, a monitor, a speaker, or a lamp. In response to the control signal from the PC 200, the notifier 20 notifies a warning (an alert) indicating that, for example, the operation is performed inappropriately by at least any one of, for example, displaying graphics (icons or messages) on a monitor, outputting a sound through a speaker, or turning on a lamp.

In the first embodiment, the camera 10, the PC 200, and the notifier 20 are separate devices, but are not limited to this structure. For example, at least two or more of the camera 10, the PC 200, and the notifier 20 may be included in one device. More specifically, the PC 200 may include at least one of the camera 10 or the notifier 20. The PC 200 and the notifier 20 may be at any locations. For example, the PC 200 and the notifier 20 may or may not be located in the same room as the camera 10. To provide the notification to the worker, the notifier 20 may be located in the same room as the camera 10 or the worker. A portable device (e.g., a smartphone or a tablet) owned by the worker may be used as the notifier 20. To provide the notification to the supervisor, the notifier 20 may be located in the same room as the supervisor. A portable device owned by the supervisor may be used as the notifier 20. The PC 200 may or may not be a cloud computer.

Figure 2B:
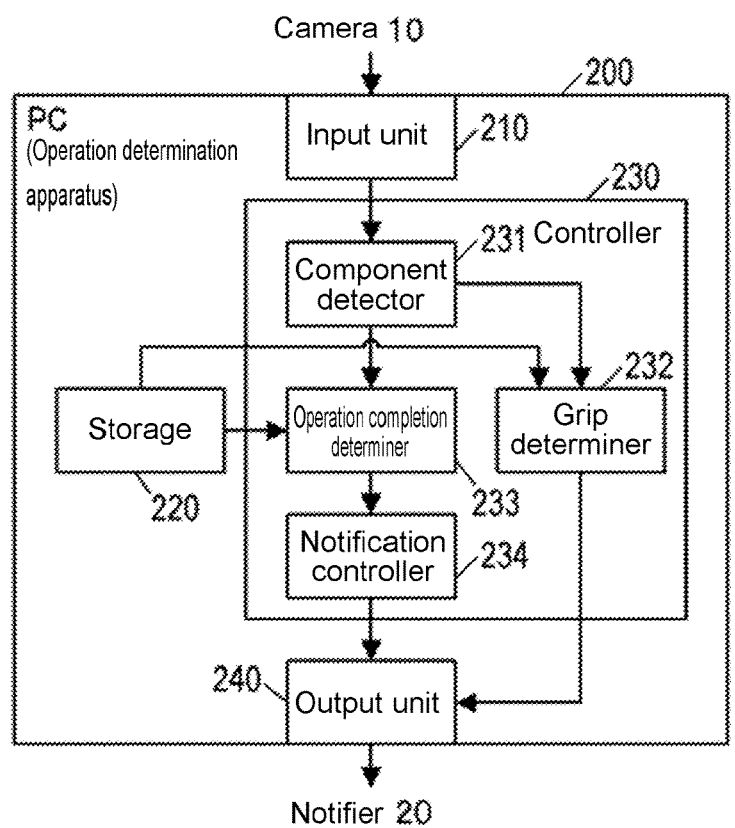
FIG. 2B is a block diagram of a personal computer (PC, or an operation determination apparatus) according to the first embodiment.

FIG. 2B is a block diagram of the PC 200. The PC 200 includes an input unit 210, a storage 220, a controller 230, and an output unit 240.

The input unit 210 obtains an operation image from the camera 10 and outputs the obtained image to the controller 230. In the first embodiment, the camera 10 captures a video, and the input unit 210 performs a process for obtaining one frame of the video from the camera 10 and outputting the frame to the controller 230 sequentially. Although the cycle of the image obtainment by the input unit 210 is not limited, the input unit 210 obtains an operation image (one frame of a video) synchronously with the image capturing with the camera 10 in the first embodiment. In other words, the input unit 210 performs the process for obtaining the operation image from the camera 10 and outputting the operation image to the controller 230 at the frame rate of the image capturing with the camera 10 (e.g., 30 fps). The camera 10 may capture still images sequentially. The input unit 210 may then perform a process for obtaining still images from the camera 10 and outputting the still images to the controller 230 sequentially. The input unit 210 is an example of an image obtainer in an aspect of the present invention.

Figures 3, 4:
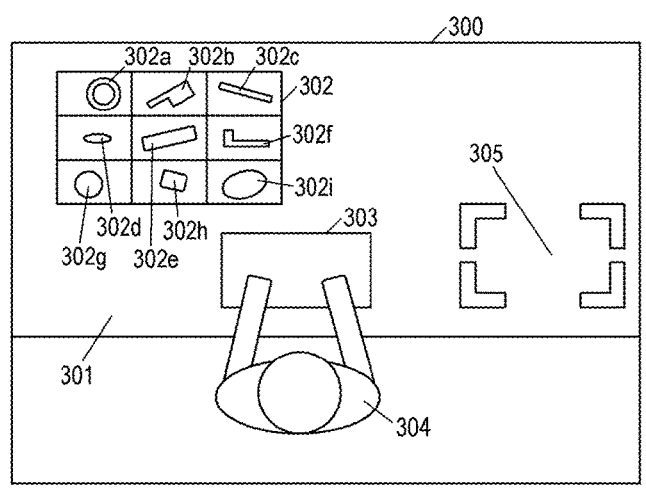
FIG. 3 is a diagram of an example operation image in the first embodiment.
FIG. 4 is a table showing example operation information in the first embodiment.

FIG. 3 is a diagram of an example operation image in the first embodiment. In FIG. 3, an operation image 300 includes a platform 301, a component case 302, a workpiece 303, and a worker 304 in the image. The component case 302 stores multiple components 302a to 302i being sorted. This facilitates and increases the accuracy of, for example, detecting the components or calculating the distance traveled by the components. In the first embodiment, the operation image may also be a captured image of at least one operation including the worker placing the workpiece in a predetermined area after completing the at least one operation. The platform 301 indicates a standby position 305 with pieces of tape or other marks. The standby position 305 is the predetermined position at which the workpiece 303 is placed after the operations in the process are complete. This facilitates and increases the accuracy of, for example, detecting the standby position 305 or determining whether the workpiece 303 is placed at the standby position 305.

Any number of components may be placed on the platform 301, and the components may be stored in other than the component case 302. Although the components may be stacked on one another, the components may be sorted in the order of operations to facilitate and increase the accuracy of, for example, detecting each component or calculating the distance traveled by each component. The operation image may include any area or may include any objects. The operation image is a captured image of a worker performing an operation or process without, for example, the component case 302 (components placed on the platform 301) appearing in the image.

The storage 220 stores programs executed by the controller 230 and various data sets to be used in the controller 230. For example, the storage 220 is an auxiliary storage device such as a hard disk drive or a solid state drive. In the first embodiment, information (operation information) indicating the correspondence between an operation and a component to be attached to the workpiece in the operation is prestored in the storage 220. The operation information facilitates, for example, identification of the current operation, the next operation, and the component to be used in the operation. The PC 200 may include an information obtainer that obtains the operation information, and the operation information may be stored in a device external to the PC 200. The information obtainer is an example of an information obtainer in an aspect of the present invention.

FIG. 4 is a table showing example operation information in the first embodiment. The operation information 400 in FIG. 4 indicates components to be attached to the workpiece during operations in the order of processes and operations. More specifically, the information indicates that manufacturing a product includes processes 1 to 3 performed in this order and that operations 1-1 to 1-3 in the process 1, operations 2-1 to 2-3 in the process 2, and operations 3-1 to 3-3 in the process 3 are performed in this order. The information also indicates use of the component 302a in the operation 1-1, the component 302b in the operation 1-2, and the component 302c in the operation 1-3. Similarly, the information indicates use of the component 302d in the operation 2-1, the component 302e in the operation 2-2, the component 302f in the operation 2-3, the component 302g in the operation 3-1, the component 302h in the operation 3-2, and the component 302i in the operation 3-3.

The controller 230 includes, for example, a central processing unit (CPU), a random-access memory (RAM), and a read-only memory (ROM) to control each unit and perform various information processes. In the first embodiment, the controller 230 obtains an operation image from the input unit 210 and operation information from the storage 220, and determines whether the current operation is performed appropriately based on the operation image and the operation information. When determining that the current operation is performed inappropriately, the controller 230 outputs a control signal to the output unit 240 to provide a predetermined notification.

The output unit 240 outputs the control signal output from the controller 230 to the notifier 20.

The controller 230 is described in more detail. The controller 230 includes a component detector 231, a grip determiner 232, an operation completion determiner 233, and a notification controller 234.

The component detector 231 obtains an operation image from the input unit 210, detects components in the obtained operation image, and outputs the result of detecting the components (e.g., the type, position, or orientation of the components) to the grip determiner 232 and to the operation completion determiner 233. The component detector 231 also detects a workpiece in the obtained operation image and outputs the result of detecting the workpiece (e.g., the position or orientation of the workpiece) to the operation completion determiner 233. The component detector 231 is an example of a component detector in an aspect of the present invention.

Any algorithm may be used for component detection and workpiece detection performed by the component detector 231. For example, the components and the workpiece may be detected through existing object detection, or specifically with a detector (discriminator) that combines an image feature such as a histogram of oriented gradients (HoG) or a Haar-like feature and boosting. The components and the workpiece may be detected using a trained model generated through existing machine learning, or specifically using a trained model generated by deep learning, examples of which include a region-based convolutional neural networks (R-CNN), Fast R-CNN, you only look once (YOLO), or a single shot multibox detector (SSD).

The grip determiner 232 determines, based on the detection result from the component detector 231 (the result of detecting the components), whether the worker is gripping a component and whether the component gripped by the worker is a component to be attached to the workpiece in the current operation. More specifically, the grip determiner 232 obtains operation information from the storage 220 and determines whether the component gripped by the worker is the component to be attached to the workpiece in the current operation based on the result of detecting the component and the operation information. The operation information is used to identify the component to be attached to the workpiece in the current operation. When determining that the component gripped by the worker is the component to be attached to the workpiece in the current operation, the grip determiner 232 notifies this determination to the operation completion determiner 233. When determining that the component gripped by the worker is not the component to be attached to the workpiece, the grip determiner 232 notifies this determination to the notification controller 234. The grip determiner 232 is an example of a grip determiner in an aspect of the present invention. In the first embodiment, the grip determiner 232 obtains operation information from the storage 220. Thus, the grip determiner 232 may also serve as the information obtainer in an aspect of the present invention.

When the grip determiner 232 determines that the component gripped by the worker is the component to be attached to the workpiece in the current operation, the operation completion determiner 233 determines whether a predetermined condition indicating completion of the current operation is satisfied. The determination as to whether the predetermined condition is satisfied is performed based on the detection result (result of detecting the components or the workpiece) from the component detector 231. The operation completion determiner 233 also determines whether the workpiece is placed at the standby position based on the detection result (result of detecting the workpiece) from the component detector 231. For example, when the component detector 231 can detect the standby position (marks for the standby position) in the operation image and the workpiece is detected at the detected standby position, the operation completion determiner 233 can determine that the workpiece is placed at the standby position. When the operation completion determiner 233 identifies the standby position in advance, the component detector 231 is not to detect the standby position. In the first embodiment, the operation completion determiner 233 obtains operation information from the storage 220 and identifies each process and each operation from the obtained operation information. The determination as to whether the workpiece is placed at the standby position before completion of the operations in the current process is achieved by performing the two determinations described above. When determining that the workpiece is placed at the standby position before completion of the operations in the current process, the operation completion determiner 233 notifies this determination to the notification controller 234. The operation completion determiner 233 is an example of an operation completion determiner in an aspect of the present invention. In the first embodiment, the operation completion determiner 233 obtains the operation information from the storage 220. Thus, the operation completion determiner 233 may also serve as the information obtainer in an aspect of the present invention.

The notification controller 234 outputs a control signal to provide a predetermined notification to the output unit 240 in response to the notification from the grip determiner 232 or the operation completion determiner 233. More specifically, when the grip determiner 232 determines that the component gripped by the worker is not the component to be attached to the workpiece in the current operation, the notification controller 234 controls a predetermined notification to be provided. When the operation completion determiner 233 determines that the workpiece is placed at the standby position before completion of the operations in the current process, the notification controller 234 also controls a predetermined notification to be provided. The notification controller 234 is an example of a notification controller in an aspect of the present invention.

Figure 5:
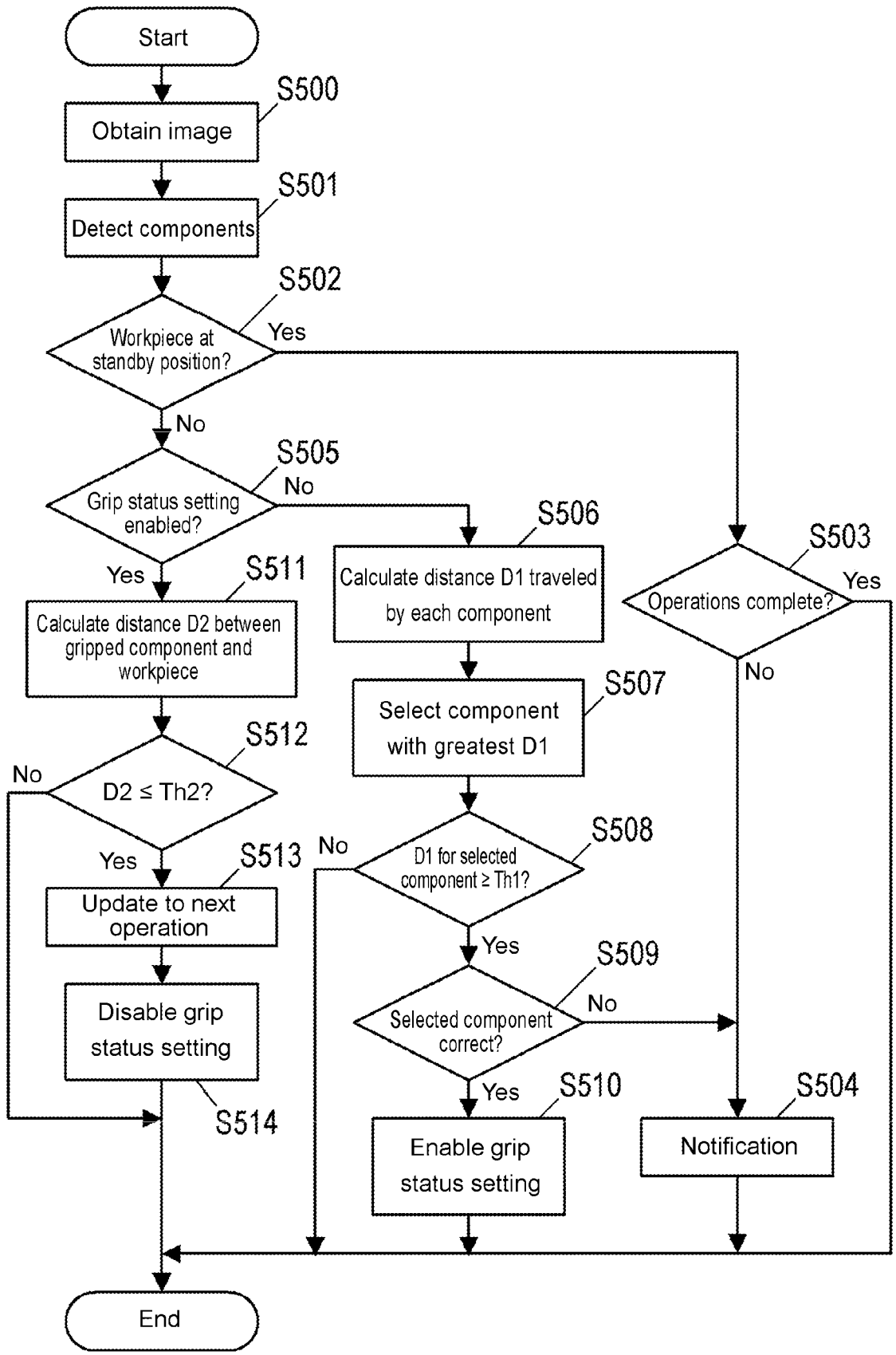
FIG. 5 is a flowchart of an example procedure according to the first embodiment.

FIG. 5 is a flowchart of an example procedure according to the first embodiment. The PC 200 repeats the procedure in FIG. 5. Although the repetition cycle of the procedure in FIG. 5 is not limited, the procedure in FIG. 5 is repeated at the frame rate of the image capturing with the camera 10 (e.g., 30 fps).

In the procedure in FIG. 5, a current operation flag is used to identify the current operation (and process). The current operation flag corresponds to an operation indicated by the operation information. For example, the current operation flag=1 corresponds to the operation 1-1 in the process 1, the current operation flag=2 corresponds to the operation 1-2 in the process 1, and the current operation flag=3 corresponds to the operation 1-3 in the process 1. The current operation flag=4 corresponds to the operation 2-1 in the process 2. The current operation flag=5 corresponds to the operation 2-2 in the process 2. The current operation flag=6 corresponds to the operation 2-3 in the process 2. The current operation flag=7 corresponds to the operation 3-1 in the process 3, the current operation flag=8 corresponds to the operation 3-2 in the process 3, and the current operation flag=9 corresponds to the operation 3-3 in the process 3. The current operation flag is set to 1 in the initial state.

First, the input unit 210 obtains an operation image from the camera 10 (step S500).

The component detector 231 then obtains the operation image from the input unit 210 and detects components and a workpiece in the obtained operation image (step S501). When the operation image 300 in FIG. 3 is obtained, the components 302a to 302i and the workpiece 303 are detected.

The operation completion determiner 233 then determines whether the workpiece is placed at the standby position based on the detection result (result of detecting the workpiece) obtained in step S501 (step S502). When the workpiece is determined to be placed at the standby position (Yes in step S502), the processing advances to step S503. When the workpiece is determined not at the standby position (No in step S502), the processing advances to step S505.

In step S503, the operation completion determiner 233 determines whether the operations in the current process are complete. When the operations in the current process are determined to be complete (Yes in step S503), the procedure in FIG. 5 ends. When the current process is determined to include an incomplete operation (No in step S503), the processing advances to step S504.

In the procedure in FIG. 5, the current operation flag is updated (by an increment of 1) every time an operation is determined to be complete. This updates the operation as the current operation to the next operation. The operation completion determiner 233 can thus determine whether the operations in the current process are complete based on the current operation flag and the operation information.

For example, when the current operation flag is one of 1 to 3, the current process is determined to be the process 1 with at least one of the operations 1-1 to 1-3 being incomplete. When the workpiece is placed at the standby position for the first time after the current operation flag is turned to 4, the current process is determined to be the process 1 with its operations 1-1 to 1-3 being complete. When the current operation flag is 4 and the workpiece has been placed at the standby position in the past with the current operation flag being 4, the current process is determined to be the process 2 with its operation 2-1 being incomplete.

Similarly, when the current operation flag is 5 or 6, the current process is determined to be the process 2 with at least one of its operations 2-2 or 2-3 being incomplete. When the workpiece is placed at the standby position for the first time after the current operation flag is turned to 7, the current process is determined to be the process 2 with its operations 2-1 to 2-3 being complete. When the current operation flag is 7 and the workpiece has been placed at the standby position in the past with the current operation flag being 7, the current process is determined to be the process 3 with its operation 3-1 being incomplete. Similarly, when the current operation flag is 8 or 9, the current process is determined to be the process 3 with at least one of the operation 3-2 or 3-3 being incomplete. When the current operation flag is 10, the current process is determined to be the process 3 with its operations 3-1 to 3-3 being complete.

In step S504, the notification controller 234 outputs a control signal to provide a predetermined notification to the output unit 240. The output unit 240 transmits the control signal to the notifier 20, and the notifier 20 provides the predetermined notification.

In step S505, the operation completion determiner 233 determines whether a grip status setting (setting indicating the status in which the worker is gripping the component to be attached to the workpiece in the current operation) is enabled. When the grip status setting is determined to be enabled (Yes in step S505), the processing advances to step S511. When the grip status setting is determined to be disabled (No in step S505), the processing advances to step S506.

In step S506, the grip determiner 232 calculates the distance D1 traveled by the components detected in step S501. For the multiple components detected in step S501, the respective distances D1 traveled by the components are calculated. Each traveled distance D1 may be calculated with any method. For example, the distance between the detection position of a component at the start of the current operation and the current detection position of the component is calculated as the traveled distance D1. The distance between the detection position of a component at a predetermined time before and the current detection position of the component, in other words, the distance traveled by the component over the predetermined period, may be calculated as the traveled distance D1.

In step S507, for the multiple components detected in step S501, the grip determiner 232 selects the component traveling the greatest distance D1 calculated in step S506 from the multiple components. When one component is detected in step S501, the component is selected. Although a component that is not gripped by a worker may move due to, for example, movement of a platform, a gripped component typically moves greater than the component that is not gripped. The processing in step S507 can thus select the component that is likely to be gripped by the worker from the multiple components.

Subsequently, the grip determiner 232 determines whether the distance D1 traveled by the component selected in step S507 is greater than or equal to a threshold Th1 (step S508). A worker gripping a component tends to move the component greatly to attach it to a workpiece. The processing in step S508 can thus determine whether the worker is gripping the component. For the distance D1 traveled by the selected component determined to be greater than or equal to the threshold Th1 (Yes in step S508), or more specifically, upon determination that the worker is gripping the component, the processing advances to step S509. For the distance D1 traveled by the selected component determined to be less than the threshold Th1 (No in step S508), or more specifically, upon determination that the worker is not gripping the component, the procedure in FIG. 5 ends.

In step S509, the grip determiner 232 determines whether the component gripped by the worker (the component selected in step S507) is a correct component (a component to be attached to the workpiece in the current operation). When the component gripped by the worker is determined to be the correct component (Yes in step S509), the processing advances to step S510. When the component gripped by the worker is determined to be an incorrect component (No in step S509), the processing advances to step S504 and the predetermined notification is provided. The correct component is determined based on the current operation flag and the operation information. More specifically, the grip determiner 232 determines the component associated with an operation corresponding to the current operation flag in the operation information as the correct component. For the current operation flag being 1, the component 302a associated with the operation 1-1 is determined to be the correct component.

In step S510, the grip determiner 232 enables the grip status setting.

In step S511, the operation completion determiner 233 calculates the distance D2 between the component gripped by the worker and the workpiece. The distance D2 may be calculated with any method. For example, the distance between the detection position (e.g., central position) of the component and the detection position of the workpiece is calculated as the distance D2. The Intersection over Union (IoU) of bounding boxes (the proportion or the size ratio of the area of overlap between the bounding box for the component and the bounding box for the workpiece to the area of union of the bounding box for the component and the bounding box for the workpiece) may be calculated as the distance D2. The proportion or the size ratio of the area of overlap between the bounding box for the component and the bounding box for the workpiece to the bounding box for one of the component or the workpiece may be calculated as the distance D2. When the workpiece is fixed (the position or the orientation is unchangeable), the distance D2 may be calculated based on, for example, the position of the component gripped by the worker without detecting the workpiece.

The operation completion determiner 233 then determines whether the distance D2 calculated in step S511 is less than or equal to a threshold Th2 (step S512). Typically, when a component is attached to a workpiece, the distance between them is shorter. Thus, the processing in step S512 can determine whether the current operation is complete. When the distance D2 is determined to be less than or equal to the threshold Th2 (Yes in step S512), or more specifically, when the current operation is determined to be complete, the processing advances to step S513. When the distance D2 is determined to be greater than the threshold Th2 (No in step S512), or more specifically, when the current operation is determined to be incomplete, the procedure in FIG. 5 ends. The distance D2 being less than or equal to the threshold Th2 is an example of the predetermined condition described above.

In step S513, the operation completion determiner 233 updates the current operation flag (by an increment of 1) to update the operation as the current operation to the next operation.

The operation completion determiner 233 then disables the grip status setting (step S514).

A component (the type of the component, such as the shape or size) to be attached to a workpiece in an operation has predetermined features independently of a worker. In the first embodiment, accurate determination as to whether the operation is performed appropriately is achieved by determining whether the component gripped by the worker is the component to be attached to the workpiece in the operation. When the component gripped by the worker is determined not to be the component to be attached to the workpiece in the operation, the predetermined notification is provided. This can reduce mistakes or omissions in the operation.

The operation completion determiner 233 allows determination as to whether the operation is appropriately complete as well as whether the operation is performed appropriately. When the workpiece is determined to be placed in the predetermined area before the operations in the process are complete, the predetermined notification is provided. This can more reliably reduce omissions in the operation.

Second Embodiment

A second embodiment of the present invention will now be described.

Figure 6:
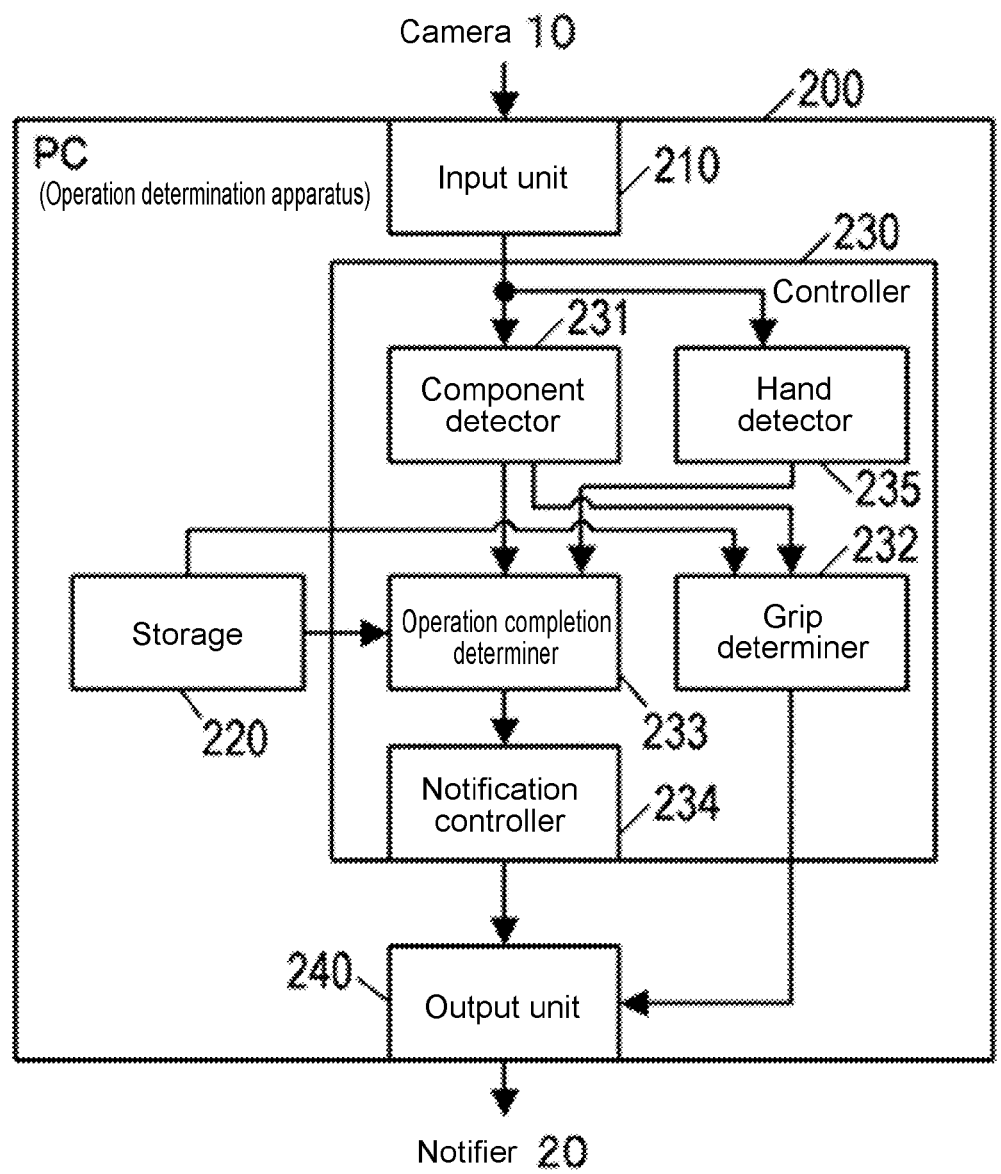
FIG. 6 is a block diagram of a PC (operation determination apparatus) according to a second embodiment showing an example structure.

In the second embodiment, the structure of the operation determination system is similar to that in the first embodiment. FIG. 6 is a block diagram of the PC 200 in the second embodiment showing an example structure. In the second embodiment, as in the first embodiment, the PC 200 includes the input unit 210, the storage 220, the controller 230, and the output unit 240. In the second embodiment, as in the first embodiment, the controller 230 includes the component detector 231, the grip determiner 232, the operation completion determiner 233, and the notification controller 234. In the second embodiment, the controller 230 further includes a hand detector 235. In the second embodiment, the processes other than those described below are the same as in the first embodiment.

The hand detector 235 obtains an operation image from the input unit 210, detects a hand (or hands) of the worker in the obtained operation image, and outputs the result of detecting the hand (e.g., the position of the hand) to the operation completion determiner 233. The hand detector 235 is an example of a hand detector in an aspect of the present invention.

Figure 7:
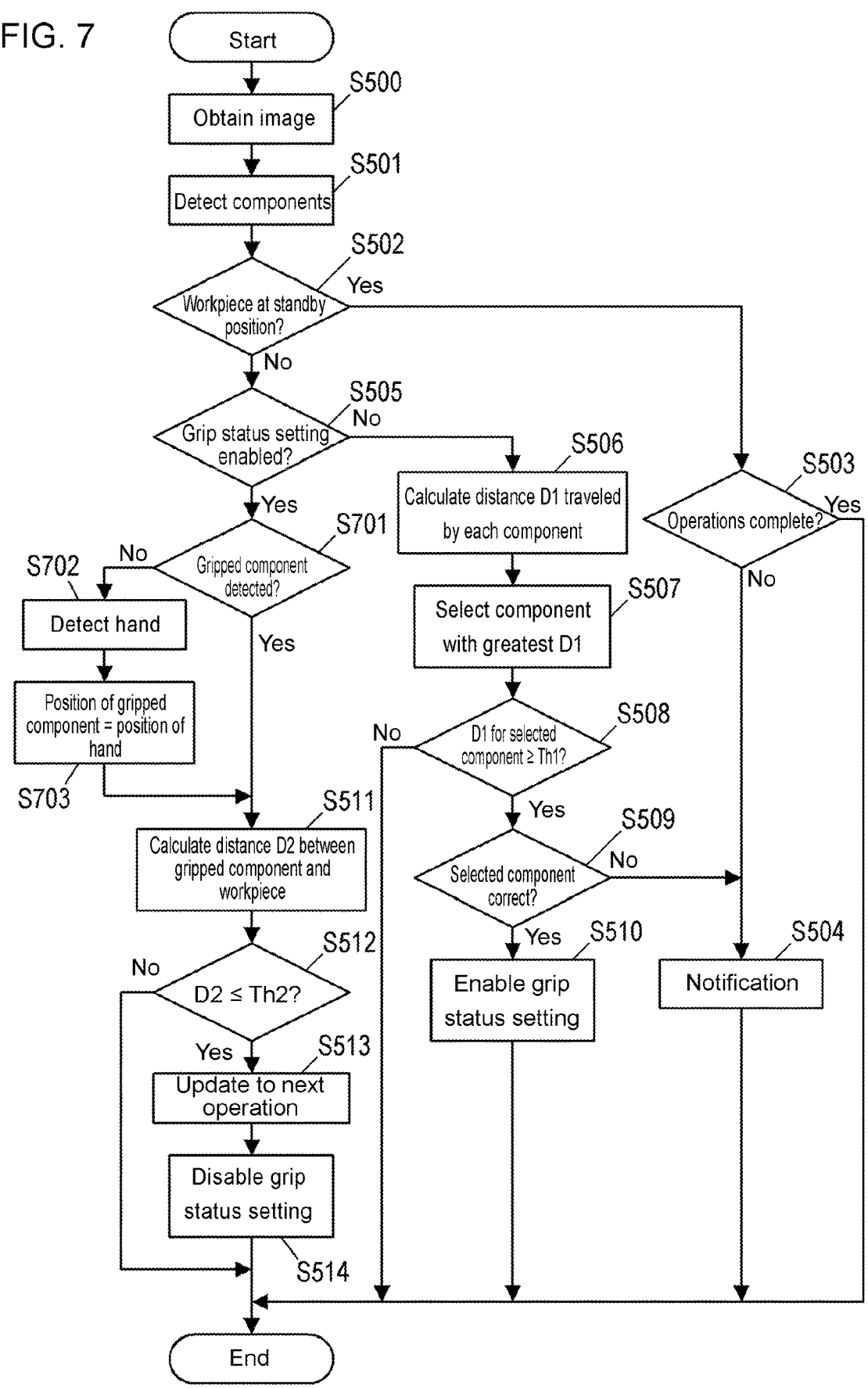
FIG. 7 is a flowchart of an example procedure according to the second embodiment.

FIG. 7 is a flowchart of an example procedure according to the second embodiment. The PC 200 repeats the procedure in FIG. 7. Although the repetition cycle of the procedure in FIG. 7 is not limited, the procedure in FIG. 7 is repeated at the frame rate of the image capturing with the camera 10 (e.g., 30 fps).

In FIG. 7, the same reference numerals as in FIG. 5 denote the same processes as in FIG. 5 (the first embodiment). In the procedure in FIG. 7, when the grip status setting is determined to be enabled in step S505 (Yes in step S505), the processing advances to step S701 instead of step S511.

In step S701, the operation completion determiner 233 determines whether the component gripped by the worker is detected by the component detector 231 (whether the component gripped by the worker is detected in step S501). When the component gripped by the worker is determined to be detected by the component detector 231 (Yes in step S701), the processing advances to step S511. When the component gripped by the worker is determined to be undetected by the component detector 231 (No in step S701), the processing advances to step S702.

In step S702, the hand detector 235 obtains the operation image from the input unit 210 and detects the worker's hand in the obtained operation image. The operation completion determiner 233 then sets the position of the hand detected in step S702 as the position of the component gripped by the worker (step S703).

As described above, in the second embodiment, when the component gripped by the worker is undetected, the position of the detected hand is used as the position of the component gripped by the worker. Thus, when the component gripped by the worker is covered by the worker's hand and undetectable, the determination as to whether the operation is complete can be performed.

Third Embodiment

A third embodiment of the present invention will now be described. The structures of the operation determination system and the PC 200 in the third embodiment are similar to those in the first embodiment.

Figure 8:
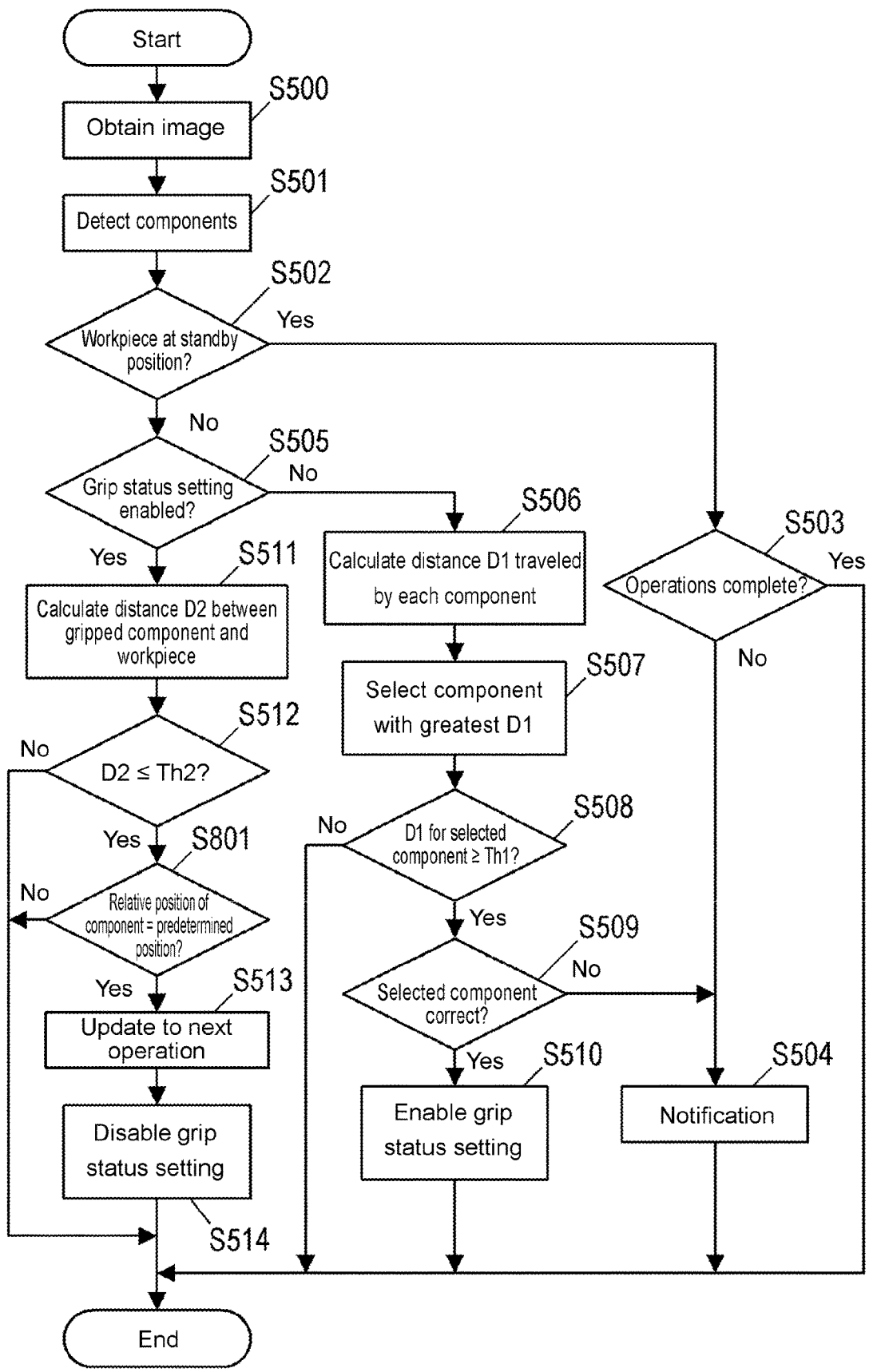
FIG. 8 is a flowchart of an example procedure according to a third embodiment.

FIG. 8 is a flowchart of an example procedure according to the third embodiment. The PC 200 repeats the procedure in FIG. 8. Although the repetition cycle of the procedure in FIG. 8 is not limited, the procedure in FIG. 8 is repeated at the frame rate of the image capturing with the camera 10 (e.g., 30 fps).

In FIG. 8, the same reference numerals as in FIG. 5 denote the same processes as in FIG. 5 (the first embodiment). In the procedure in FIG. 8, when the distance D2 is determined to be less than or equal to the threshold Th2 in step S512 (Yes in step S512), the processing advances to step S801 instead of step S513.

In step S801, the operation completion determiner 233 determines whether the gripped component (the component gripped by the worker) is at a predetermined position relative to the workpiece. Typically, in attaching a component to a workpiece, the position of the component relative to the workpiece is often predetermined. Thus, performing the processing in step S801 further increases the accuracy of determining whether the current operation is complete. When the gripped component is determined to be at the predetermined position relative to the workpiece (Yes in step S801), or more specifically, when the current operation is determined to be complete, the processing advances to step S513. When the gripped component is determined not to be at the predetermined position relative to the workpiece (No in step S801), or more specifically, when the current operation is determined to be incomplete, the procedure in FIG. 8 ends. The gripped component being at the predetermined position relative to the workpiece is an example of the predetermined condition described in the first embodiment.

Typically, in attaching a component to a workpiece, the orientation of the component relative to the workpiece is also often predetermined. The operation completion determiner 233 may determine whether the gripped component is in the predetermined orientation relative to the workpiece (a third determination). The gripped component being in the predetermined orientation relative to the workpiece is also an example of the predetermined condition described in the first embodiment.

Performing at least one of the three determinations below can determine whether the current operation is complete. One, two, or all of the three determinations may be performed. Performing two determinations rather than one determination is expected to provide accurate determination as to whether the current operation is complete. The three determinations below, rather than one or two determinations, can provide accurate determination as to whether the current operation is complete.

The determination as to whether the distance D2 is less than or equal to the threshold Th2

The determination as to whether the gripped component is at the predetermined relative position The determination as to whether the gripped component is in the predetermined relative orientation A margin may be used to determine whether the gripped component is at the predetermined relative position and whether the gripped component is in the predetermined relative orientation. More specifically, when the difference between the relative position of the gripped component and the predetermined position is less than or equal to a threshold, the gripped component is determined to be at the predetermined relative position. When the difference is greater than the threshold, the gripped component is determined not to be at the predetermined relative position.

Similarly, when the difference (e.g., angular difference) between the relative orientation of the gripped component and the predetermined orientation is less than or equal to a threshold, the gripped component is determined to be in the predetermined relative orientation. When the difference is greater than the threshold, the gripped component is determined not to be in the predetermined relative orientation.

A specific example in which the three determinations are all performed will now be described. FIGS. 9A to 9E show example states of a component and a workpiece. Throughout FIGS. 9A to 9E, the workpiece is at the same position and in the same orientation. In FIG. 9A, the component is appropriately attached to the workpiece. In FIG. 9B, the component is in the same orientation as in FIG. 9A (the component is in the predetermined relative orientation). However, the distance D2 is greater than the threshold Th2 and the position of the component differs from the position in FIG. 9A (the component is not at the predetermined relative position). Thus, the operation is determined to be incomplete. In FIG. 9C, the distance D2 is less than or equal to the threshold Th2, and the component is in the same orientation as in FIG. 9A. However, the position of the component differs from the position in FIG. 9A. Thus, the operation is determined to be incomplete. In FIG. 9D, the distance D2 is less than or equal to the threshold Th2 and the position of the component matches the position in FIG. 9A. However, the orientation of the component differs from the orientation in FIG. 9A. Thus, the operation is determined to be incomplete. In FIG. 9E, the distance D2 is less than or equal to the threshold Th2 and the position and the orientation of the component match the position and the orientation in FIG. 9A. Thus, the operation is determined to be complete.

As described above, the structure in the third embodiment uses conditions different from those in the first embodiment as the predetermined condition indicating completion of an operation and can produce effects similar to those in the first embodiment. In some embodiments, the predetermined condition may include multiple conditions to further increase the accuracy of determining whether the operation is complete.

Others

The embodiments described above are mere examples of the present invention. The present invention is not limited to the embodiments described above, but may be modified variously within the scope of the technical ideas of the invention. The processing in the first to third embodiments may be combined as appropriate.

Appendix 1

An operation determination apparatus (100, 200), comprising:
  an image obtainer (101, 210) configured to obtain a captured image of a worker gripping a component and performing an operation of attaching the component to a workpiece;
  a component detector (102, 231) configured to detect a component in the captured image obtained by the image obtainer;
  a grip determiner (103, 232) configured to determine, based on a detection result from the component detector, whether the worker is gripping a component and whether the component gripped by the worker is a component to be attached to the workpiece in the operation; and a notification controller (104, 234) configured to control a predetermined notification to be provided in response to the grip determiner determining that the component gripped by the worker is not the component to be attached to the workpiece in the operation.

Appendix 2

An operation determination method, comprising:
(S500) obtaining a captured image of a worker gripping a component and performing an operation of attaching the component to a workpiece;
(S501) detecting a component in the obtained captured image;
(S506 to S509) determining, based on a result of the detecting, whether the worker is gripping a component and whether the component gripped by the worker is a component to be attached to the workpiece in the operation; and
(S504) controlling a predetermined notification to be provided in response to the component gripped by the worker being determined not to be the component to be attached to the workpiece in the operation.

REFERENCE SIGNS LIST

100: Operation determination apparatus
101: Image obtainer
102: Component detector
103: Grip determiner
104: Notification controller
10: Camera
20: Notifier
200: PC (Operation determination apparatus)
210: Input unit
220: Storage
230: Controller
240: Output unit
231: Component detector
232: Grip determiner
233: Operation completion determiner
234: Notification controller
235: Hand detector
300: Operation image
301: Platform
302: Component case
302*a*-302*i*: Component
303: Workpiece
304: Worker
305: Standby position
400: Operation information

The invention claimed is:

1. An operation determination apparatus, comprising:
a memory configured to store computer-executable instructions; and
a processor configured to execute the computer-executable instructions stored in the memory to implement:
an image obtainer configured to obtain a captured image of a worker gripping a component and performing an operation of attaching the component to a workpiece;
a component detector configured to detect a component in the captured image obtained by the image obtainer;
a grip determiner configured to determine, based on a detection result from the component detector, whether the worker is gripping a component and whether the component gripped by the worker is a component to be attached to the workpiece in the operation; and
a notification controller configured to control a predetermined notification to be provided in response to the grip determiner determining that the component gripped by the worker is not the component to be attached to the workpiece in the operation, wherein
the grip determiner determines that the worker is gripping the component in response to a distance traveled by the detected component being greater than or equal to a first threshold, and
the distance traveled by the detected component is a distance between a detection position of the component at a predetermined time and a current detection position of the component detected after the predetermined time.

2. The operation determination apparatus according to claim 1, wherein
in response to the component detector detecting a plurality of components, the grip determiner selects a component traveling a greatest distance from the plurality of components, and
in response to a distance traveled by the selected component being greater than or equal to the first threshold, the grip determiner determines that the worker is gripping the selected component.

3. The operation determination apparatus according to claim 1, wherein the processor is configured to execute the computer-executable instructions stored in the memory to further implement:
an information obtainer configured to obtain information indicating a correspondence between the operation and a component to be attached to the workpiece in the operation,
wherein the grip determiner determines whether the component gripped by the worker is the component to be attached to the workpiece in the operation based on the detection result from the component detector and the information obtained by the information obtainer.

4. The operation determination apparatus according to claim 1, wherein the processor is configured to execute the computer-executable instructions stored in the memory to further implement:
an operation completion determiner configured to determine whether a predetermined condition to indicate completion of the operation is satisfied based on the detection result from the component detector in response to the grip determiner determining that the component gripped by the worker is the component to be attached to the workpiece in the operation.

5. The operation determination apparatus according to claim 4, wherein
the predetermined condition includes a distance between the component gripped by the worker and the workpiece being less than or equal to a second threshold.

6. The operation determination apparatus according to claim 4, wherein
the predetermined condition includes the component being at a predetermined position relative to the workpiece.

7. The operation determination apparatus according to claim 4, wherein the predetermined condition includes the component being in a predetermined orientation relative to the workpiece.

8. The operation determination apparatus according to claim 4, wherein
the image obtainer obtains a captured image of at least one operation including the worker placing the workpiece in a predetermined area after completing the at least one operation,
the component detector detects the workpiece in the captured image obtained by the image obtainer,
the operation completion determiner determines whether the workpiece is placed in the predetermined area based on the detection result from the component detector, and
the notification controller controls the predetermined notification to be provided in response to the operation completion determiner determining that the workpiece is placed in the predetermined area before completion of the at least one operation.

9. The operation determination apparatus according to claim 4, wherein the processor is configured to execute the computer-executable instructions stored in the memory to further implement:
a hand detector configured to detect a hand of the worker in the captured image obtained by the image obtainer,
wherein the operation completion determiner uses a position of the hand detected by the hand detector as a position of the component gripped by the worker in response to the grip determiner determining that the component gripped by the worker is the component to be attached to the workpiece in the operation and then the component gripped by the worker being undetected by the component detector.

10. An operation determination method, comprising:
obtaining a captured image of a worker gripping a component and performing an operation of attaching the component to a workpiece;
detecting a component in the obtained captured image;
determining, based on a result of the detecting, whether the worker is gripping a component and whether the component gripped by the worker is a component to be attached to the workpiece in the operation; and
controlling a predetermined notification to be provided in response to the component gripped by the worker being determined not to be the component to be attached to the workpiece in the operation, wherein
the determining determines that the worker is gripping the component in response to a distance traveled by the detected component being greater than or equal to a first threshold, and
the distance traveled by the detected component is a distance between a detection position of the component at a predetermined time and a current detection position of the component detected after the predetermined time.

11. A non-transitory computer readable medium storing a program for causing a computer to perform operations included in the operation determination method according to claim 10.

* * * * *